(12) United States Patent
Balogh (10) Patent No.: US 6,201,565 B1
(45) Date of Patent: Mar. 13, 2001

(54) METHOD AND APPARATUS FOR DISPLAYING THREE-DIMENSIONAL IMAGES

(75) Inventor: Tibor Balogh, Budapest (HU)

(73) Assignees: Holografica, Budapest (HU); Sony International (Europe) GmbH, Köln-Ossendorf (DE)

( * ) Notice: Subject to any disclaimer, the term of this patent is extended or adjusted under 35 U.S.C. 154(b) by 0 days.

(21) Appl. No.: 09/155,683

(22) PCT Filed: Feb. 4, 1998

(86) PCT No.: PCT/HU98/00012

§ 371 Date: Apr. 19, 1999

§ 102(e) Date: Apr. 19, 1999

(87) PCT Pub. No.: WO98/34411

PCT Pub. Date: Aug. 6, 1998

(30) Foreign Application Priority Data

Feb. 4, 1997 (HU) .................................................. 9700348

(51) Int. Cl.[7] .............................. H04N 5/89; H04N 13/00
(52) U.S. Cl. .................................. 348/40; 348/51; 348/54; 359/28; 356/457; 396/288
(58) Field of Search .................................. 348/40–43, 51, 348/54; 345/6, 425; 359/23–25, 28, 29, 31, 15, 462, 466, 468, 471; 356/12, 457–458; 396/288, 324, 331

(56) References Cited

U.S. PATENT DOCUMENTS

| | | | |
|---|---|---|---|
| 5,416,616 | * | 5/1995 | Jenkins et al. .......................... 359/11 |
| 5,696,552 | * | 12/1997 | Aritake et al. .......................... 348/51 |
| 5,822,092 | * | 10/1998 | Davis ...................................... 359/10 |
| 5,952,988 | * | 9/1999 | Moddel ................................... 345/90 |
| 6,078,351 | * | 6/2000 | Hall, Jr. et al. ......................... 348/40 |

FOREIGN PATENT DOCUMENTS

| | | | |
|---|---|---|---|
| 0672936 A2 | 9/1995 | (EP) | .............................. H04N/13/04 |
| WO 94/23541 | 10/1994 | (WO) | ............................ H04N/13/05 |

* cited by examiner

*Primary Examiner*—Vu Le
(74) *Attorney, Agent, or Firm*—Frommer Lawrence & Haug, LLP; William S. Frommer (57) ABSTRACT

The method and apparatus of the invention pertains to a simultaneously modulated light beam carrying the information of a three-dimensional image is directed to pixels (image points) defining a first light emitting surface, a component of the light beam is emitted from the pixels within a predetermined angle of view (field of view) in the different view directions, with an intensity corresponding to the three-dimensional image, the modulated light beams are directed to the pixels from different entry angles, depending on the emitting angles within the angle of view, wherein the light beams modulated corresponding to the different directions are directed to the pixels of the first light emitting surface from one or more light emitting points of a second light emitting surface, the second light emitting surface being spaced apart with a predetermined distance from the first light emitting surface.

19 Claims, 10 Drawing Sheets

METHOD AND APPARATUS FOR DISPLAYING THREE-DIMENSIONAL IMAGES

TECHNICAL FIELD

The invention relates to a method and apparatus for displaying three-dimensional images, in particular moving images based on video signals containing three-dimensional image information. The invention may be used in all fields of displaying images.

When a planar image is produced on a surface, the light emitted or reflected from each point of the surface in any direction has approximately the same intensity (and colour). This is the working principle of a written sheet of paper (based on reflection) or a traditional television image (based on emission). But displaying a spatial image, the light emitted from a point of the surface in different directions have different intensity (and colour). This is the working principle of a window-pane regarded as a "display", or that of a hologram. In short, for producing spatial images there is needed a light emitting surface, where the intensity (and colour) of the light emitted from a point of the picture, i. e. a pixel, may be controlled, depending on the exit angle, that is, the intensity of the light may be controlled in the different emitting directions.

BACKGROUND ART

Solutions to produce spatial images with laser technology, such as holograms, stereograms, etc. are known. It is a shortcoming of the known laser systems that they are inadequate for producing three-dimensional images from video signals. A method and apparatus for producing three-dimensional pictures is known from the International Patent Application published under WO 94/23541. This specification discloses two basic methods for producing three-dimensional images.

According to a first version of this known solution, the modulated laser beams are subjected to deflection according to the directions defining a field of view, and controlled in time, so that the modulated laser beam impinges on a predetermined pixel deflected, with a given entry angle, or parallel displaced, and exits from the pixel deflected or without further deflection, according to a predetermined direction defining the field of view. A disadvantage of this solution is that the laser beam needs very precise focusing and positioning, because the direction of the exiting laser beam is determined by the entry point within the pixel.

According to the other version, the modulated laser beam arrives at the pixel without any deflection within the entry points, and the time-resolved deflection, dependent of view directions is effected with controllable active optical elements, placed in each pixel. The angle deflection, dependent of the intensity, is performed by the active optical element. An advantage of this solution is that less precise focusing and positioning is needed, but a further disadvantage is that the active optical elements make the apparatus very expensive.

Hence it is an object of the invention to provide a method and apparatus for producing three-dimensional images, enabling to produce three-dimensional images using video signals containing three-dimensional image information, and this without the need for using expensive focusing and positioning elements. It is a further object of the invention to provide a method and apparatus for producing three-dimensional images, where a high-resolution screen does not contain expensive active beam deflecting elements, and which may be manufactured economically.

DISCLOSURE OF THE INVENTION

To achieve the above mentioned goals, we have found that a method for producing a three-dimensional image, comprising the steps of:
simultaneously modulating a—preferably spatially coherent—light beam by a video signal containing three-dimensional image information; and
directing the modulated light beam to pixels (image points) defining a first light emitting surface;
emitting a component of the light beam from the pixels within a predetermined angle of view (field of view) in the different view directions, with an intensity corresponding to the three-dimensional image,
directing the modulated light beams to the pixels from different entry angles, depending on the emitting angles within the angle of view, would provide a good basis for the invention.

According to the invention, this method should include directing the light beams modulated corresponding to the different directions to the pixels of the first light emitting surface from one or more light emitting points of a second light emitting surface, said second light emitting surface being spaced apart with a predetermined distance from the first light emitting surface. Essentially with this solution the functions of the first light emitting surface. practically the screen, are separated, and only the horizontal deflection and the vertical dispersion or divergence is performed on the first light emitting surface, while the light beams necessary for the creation of the image are produced and controlled at the second light emitting surface.

A preferred version of the method according to the invention includes selecting the number of the light emitting points and the number of light beams (the angle resolution) emitted therefrom in such a manner, that their product is equal to the product of the number of pixels and the number of directions (the angle resolution) into which light beams are emitted from the pixels. With this provision the displays may be produced economically, and have a good resolution, because the pixels defining the image resolution can be arranged in a large number on the first light emitting surface, and the number of directions contributing to the three-dimensional effect may be selected appropriately large, while at the same time a relatively small number of light emitting means are sufficient on the second light emitting surface, provided that their angle resolution is sufficiently large. The number of the light emitting points is at least one, according to the invention.

A further method of the invention includes simultaneously modulating the light beams emitted in the same direction from the pixels and associated with different pixels with light information associated with the same direction, and modulating the light beams of the light emitting points corresponding to the different emitting directions of the same pixel with the light information corresponding to the different view directions of the same pixel.

In a preferred example, the steps of the method include selecting the light emitting angle of the light emitting points of the second light emitting surface equal to the view angle (field of view) of the pixels of the first light emitting surface. In this case no angle correction is needed from the light emitting points to the eye watching the display.

In another preferred embodiment the steps include selecting the light emitting angle of the light emitting points of the second light emitting surface smaller or larger than the view angle (field of view) of the pixels of the first light emitting surface. In this case a further step will be necessary, namely applying angle correction on the light emitting angle of the light emitting points between the light emitting points and the pixels, or applying angle correction on the view angle (field of view) of the pixels, within the pixels themselves.

In a further, particularly advantageous version, a mirror is foreseen to deflect into corresponding pixels the light beams of the light emitting points emitted in directions bypassing the pixels of the first light emitting surface. This provision saves the need to install further light emitting points to illuminate the pixels on or close to the edge of the screen.

To realise the object of the invention, there is also foreseen an apparatus for displaying three-dimensional images, comprising a light source modulated with video signal containing three-dimensional information, and a deflecting system controlled in time and directed towards the pixels of a light emitting surface, wherein the light emitting surface is comprising one or more optical means transmitting and/or deflecting light beams in different directions within a predetermined field of view (view angle), and the deflecting system comprising deflecting means corresponding to the view directions defining the field of view (view angle) and corresponding to the pixels.

According to the invention, the apparatus comprises a second light emitting surface comprising light emitting points, the second light emitting surface being spaced apart from the light emitting surface containing the pixels in a predetermined distance, and for each direction of the pixels of the first light emitting surface there is an associated light emitting point of the second light emitting surface, and for each light emitting point there are several associated pixels.

In a preferred embodiment, the apparatus according invention is constructed such that the number of the directions (the angle resolution) of the light beams emitted from the light emitting points is t times the number of directions of the light beams emitted from the pixels, the value of t being preferably between one and the number of pixels arranged in one line, while the number of the light emitting points is one t-th of the number of the pixels and the distances between the light emitting points are t times the distances between the pixels. Thus it is clear, that by using light emitting points with an appropriately large angle resolution, the number of the otherwise more expensive light emitting points may be substantially reduced. It also follows from the above, that one light emitting point may be sufficient, provided that its angle resolution meets the above criteria.

With another embodiment of the apparatus of the invention the light emitting points comprise acousto-optical means, polygonal mirrors, galvanic mirrors. hologram discs, electro-optical means or variable index LCD means, producing time-resolved controlled deflection in accordance with the directions defining the view angle (field of view). If necessary, the apparatus may comprise one or more angle correction elements between the time-resolved controlled deflection means and the first light emitting surface, and/or on the light emitting surface. The angle correction element is needed if the exit angle of the light emitting point is not identical with the view angle of the light beams emitted from the pixels.

In another preferred embodiment, the time-resolved controlled deflection means comprise subsequently arranged X-direction and Y-direction deflection means, where one X-direction deflection means is arranged to all light beams or to a group of the light beams or to each one of the light beams, and one Y-direction deflection means is arranged to all light beams or to a group of the light beams or to each one of the light beams.

Alternatively, with another advantageous embodiment, in the deflection system the time-resolved controlled deflection means associated with the view directions defining the view angle (field of view) are comprising spatial light modulator (SLM) means, and comprising focusing elements between the SLM means and the first light emitting surface. Such a spatial light modulator may be regarded as a small two-dimensional imaging device or display, and its position-dependent modulated light signal is converted by the focusing element into a direction-dependent modulated light signal.

In a further advantageous embodiment, the apparatus of the invention comprises one or more mirrors, said mirrors deflecting those light beams emitted from the light emitting points into corresponding pixels, which light beams would otherwise bypass the pixels of the first light emitting surface.

It is also foreseen, that in the apparatus according to the invention the first light emitting surface comprises one or more diffractive of refractive optical elements, producing a divergence of the light beams in horizontal direction at least half of the angle between the directions of neighbouring light beams emitted from the pixels, and not greater than twice this angle, while the divergence in vertical direction being larger than the horizontal divergence and not greater than 180°.

BRIEF DESCRIPTION OF THE DRAWINGS

The invention will be further demonstrated with reference to the embodiments illustrated in the accompanying drawings, in which.

DESCRIPTION OF THE PREFERRED EMBODIMENTS

Figure 1:
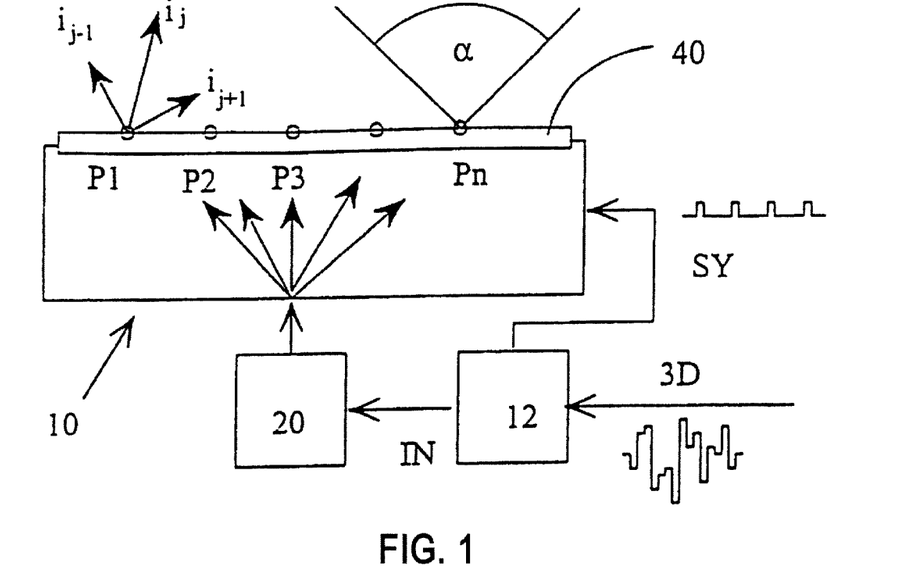
FIG. 1 is a block diagram of a known solution of the prior art.

FIG. 1 illustrates the block diagram of a three-dimensional display apparatus 10 according to the invention. The apparatus 10 comprises a 12 separator unit, separating the video signal 3D containing three-dimensional information into the synchronising signal SY and the signal IN, the latter containing intensity and colour information. The synchronising signal SY is applied to the control input of a deflection or scanning unit (not shown) within the apparatus 10. while the signal In is applied to the input of a laser- and modulator unit 20. The beams emitted from the laser- and modulator unit 20 are directed to the P1–Pn pixels, appropriately organised, and from the pixels P1–Pn light beams with different intensity and colour are being emitted into the different directions i1–im. The largest angle between the light beams emitted from the pixels P1–Pn is the view angle (field of view) α. In systems that are practically useful the view angle α should be at least approx. 60°, but as a final objective, a field of view of at least 150°–170° would be ideal (with planar displays). The number of the pixels P should be chosen to be the same order of magnitude as with the known displays., i.e. at least 100×200 pixels, preferably at least 200×300 pixels, more preferably at least 600×800 pixels should be used with a display having the size of an ordinary TV-screen.

Figure 2:
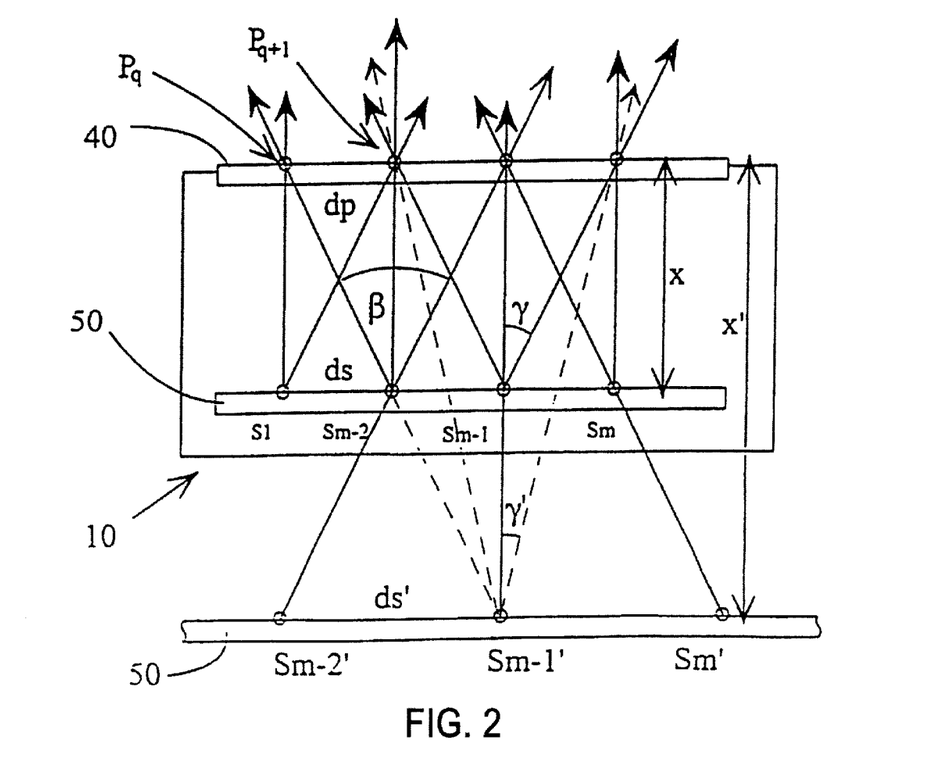
FIG. 2 is a side view of a part of an apparatus for realising the method of the invention.

FIG. 2 illustrates the method of the illumination of the individual P1–Pn pixels. As may be seen from FIG. 2, there is arranged a second light emitting surface 50 behind the first light emitting surface 40, the latter comprising the pixels P. The second light emitting surface 50 comprises light emitting points S1–Sm. One light emitting point Sj illuminates several pixels Pk, i. e. produces light for several pixels Pk. Let us assume that the distance ds between the light emitting points S is equal to the distance dp between the pixels P. Watched from within a few meters distance, an impression of a spatial (three-dimensional) image with an acceptable quality may be achieved, if the difference angle between the light beams emitted into neighbouring directions is not larger than 1°, e. g. equal to 1°. A good resolution for the purpose of the image details and contrast may be achieved if the distance dp between the pixels P is approx. 1 mm, or smaller. Assuming the simple case that the value of the view angle is 60°, and the exit angle β of the light emitting points S1–Sm is also 60°, then it is obvious that one light emitting point S must illuminate 60 pixels P to achieve 1° angle resolution. If the distance dp between the pixels P is 1 mm. than 60 pixels P cover a 6 cm long line. In this case the distance x between the first light emitting surface 40 and the second light emitting surface 50 is approx. 5.2 cm. But to have 60 different emitting directions for each pixels P, the number of the light emitting points S1–Sm must be equal to the number of pixels P. In this case the distance ds is also equal to the distance dp, i.e. ds=1 mm. This may be an obstacle in realising the light emitting points S1–Sm in practice.

As it is illustrated in FIG. 2, by increasing the distance x between the first light emitting surface 40 and the second light emitting surface 50—in FIG. 2 this is illustrated by increasing x to x'—, the distance ds will increase as well, providing substantial advantage to a practical realisation of the light emitting points S1'–Sm'. As it will be shown below, in this case the angle resolution of the individual light emitting points S1'–Sm' must increase in return. It is also clear from FIG. 2, that by increasing the distance x with a factor of two, e.g. in this case to the distance x', the distance ds' between the light emitting points S will be also two times the distance dp. At the same time, the angle resolution must increase, that is practically the angle γ between the neighbouring light emitting directions of a light emitting point S will decrease. At the same time, as it is seen from FIG. 2., that by increasing the distance from x to x', the light beam originating from the light emitting point Sm-2 in the direction of the pixel Pq, due to the displacement of the second light emitting surface 50 backwards, is now originating from the light emitting point Sm-1'. At the same time the light emitting point Sm-1' must still provide light for the pixel Pq+1. Hence it follows that by increasing the distance ds, not only must the angle resolution of the individual light emitting points S increase, but also the number of possible emitting directions of the light emitting points S. E.g. by increasing the distance x five-fold, then the necessary angle resolution, i. e. the smallest value of γ is 0.2°, while the number of served directions is 5×60=300. In exchange, the total width of a light emitting point S may reach as much as 5 mm, which is sufficient for the realisation of such light emitting points S that are suitable for a suggested practical solution.

It must be stressed, that in the following description the arrangement of the light emitting points will be explained in only one dimension. However, there is nothing in the way to realise the arrangement according to the invention along both co-ordinates, i. e. horizontally and vertically as well, and thus to provide display which makes fully realistic spatial imaging possible.

Figure 3:
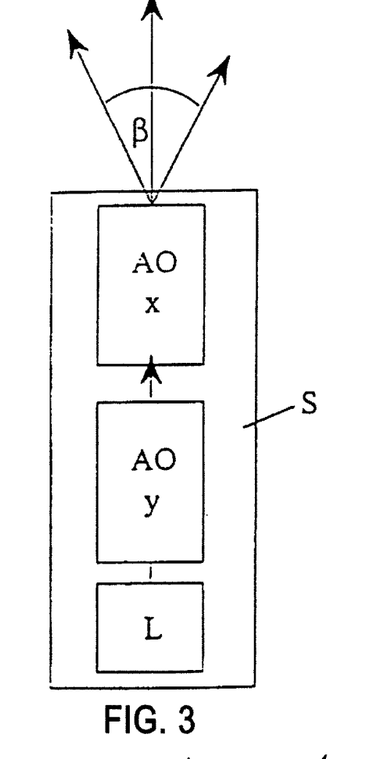
FIG. 3 is a block diagram of a light emitting point comprising an acousto-optical element.

With reference to FIG. 3, there is shown a practical realisation of a light emitting point S. This comprises a laser L, this being preferably a diode laser, but it is understood that other types of lasers, e.g. gas-, solid state or dye lasers are also suitable. The light of the laser L is deflected in vertical direction—along the Y axis—in a suitable angle by the deflector AOy. The horizontal deflection is performed in an analogous manner by the deflector AOx. The deflectors AOx and AOy are constructed as acousto-optical devices, in a known manner. But other suitable optical deflector means may be used as well, e. g. polygonal mirrors, galvanic mirrors, hologram discs, electro-optical devices (e. g. Kerr-cells), variable refraction index LCD devices or the like.

Figure 4:
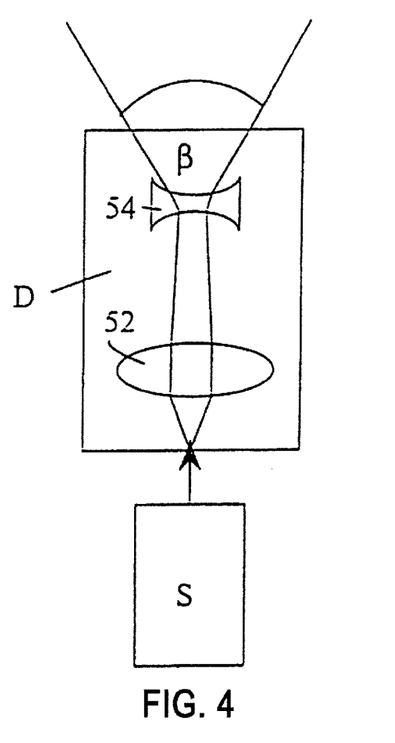
FIG. 4 is a block diagram of a light emitting point comprising an acousto-optical element and an angle correction element positioned before the light emitting point.

Considering that with known acousto-optical deflectors only relatively small—approx. 2°—deflection angles may be achieved, the exit angle β of the light emitting points S must be magnified. This magnification is performed by the angle magnifier D, a possible embodiment of which is shown in FIG. 4. Here the angle magnifier D is shown as an optical arrangement comprising traditional collecting and dispersing lenses 52 and 54. Generally, D comprises a known telescopic lens arrangement, with appropriate apertures. It must be noted that the angle magnifier D may be advantageously used for filtering out the zero order, non-deflected beam of the deflectors AO, using apertures and diaphragms (not shown). With a specific embodiment, the light emitted from the angle magnifier D is magnified approx. fivefold, i. e. the exit angle β is approx. 10°.

Figure 5:
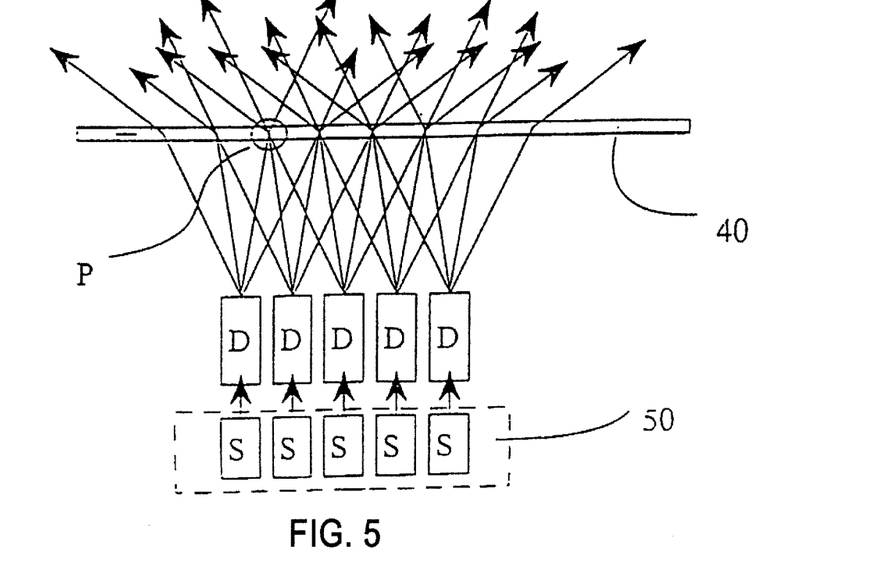
FIG. 5 is a schematic diagram of a first light emitting surface with light emitting points comprising angle correction elements and acousto-optical elements, and angle correction elements provided on the first light emitting surface.

FIG. 5. shows that with the arrangement of light emitting points S placed beside each other and associated angle magnifiers D light beams from the individual light emitting points S are arriving from different directions and with different intensities to the different pixels P of the first light emitting surface 40. But the angle magnification practically attainable by the angle magnifier D is still not sufficient to provide the desired view angle. Therefore, a further angle magnification may be necessary in the pixels P, which may be performed in a preferred embodiment by the micro-lens system 46 as shown in FIG. 7.

Figure 6A:
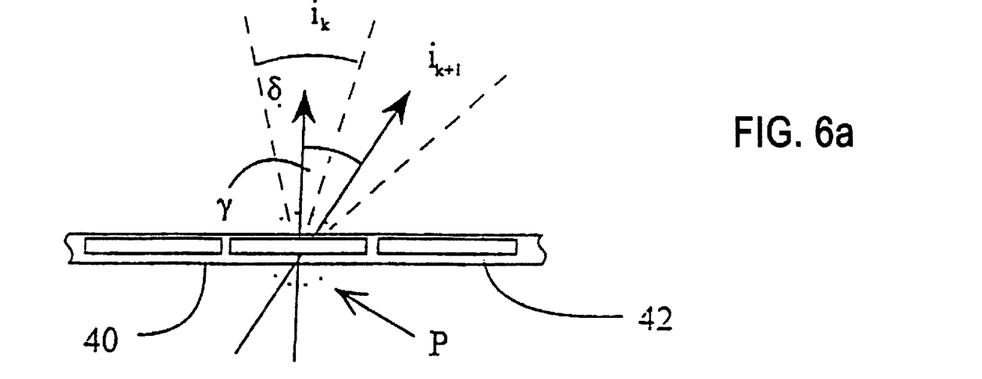
FIG. 6a is a schematic diagram of the divergence characteristics of two light beams pointing in two neighbouring directions, and passing through the first light emitting surface.

Returning to FIG. 6a, the light beams emitted from the pixel P in neighbouring directions ik and ik+1 have an angle of γ. As mentioned, the value of the angle γ is smaller than 1°. However, to have the impression of a continuous image, it is necessary that the beams emitted in the neighbouring directions ik and ik+1 are at least adjacent. Thus it follows that the divergence δ of the beams emitted from the pixels P must be at least as large, but preferably slightly larger than the angle γ, i.e. the angle resolution within the view angle α of the pixels P. To obtain this, an optical element must be provided on the first light emitting surface 40 to ensure the appropriate divergence δ of the beams emitted from the pixels P, this latter divergence δ in practice being approx. 1°. This optical element may be constructed as a holographic element 42, which may be an element comprising several discrete sub-elements associated with one or more pixels P, as shown in FIG. 6a, but may also be constructed as a single optical element covering the whole screen.

Figure 6B:
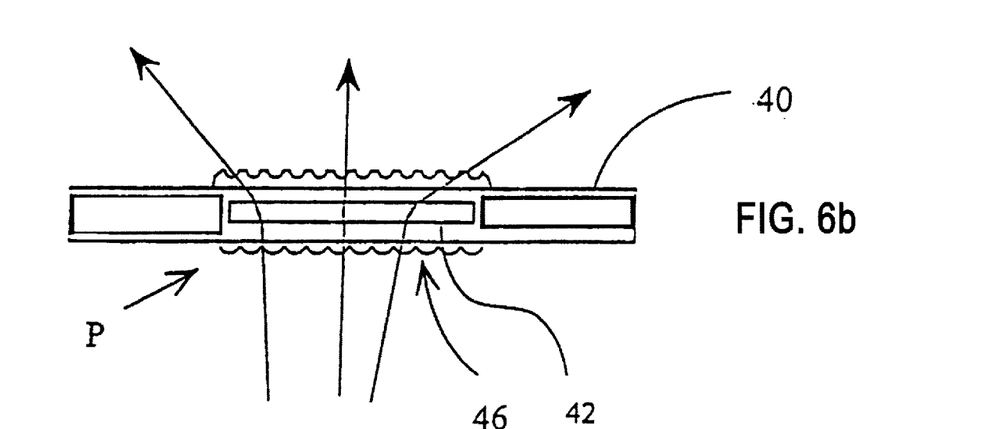
FIG. 6b is a magnified side view of a pixel containing a holographic angle correction element.

If we give up the demand to have spatial imaging along the Y-direction, and arrange the light emitting points in only one row, as will be discussed more in detail below, then the necessary dispersion or divergence along the Y direction may be provided by the holographic element 42, as shown in FIG. 6b.

Figure 7A:
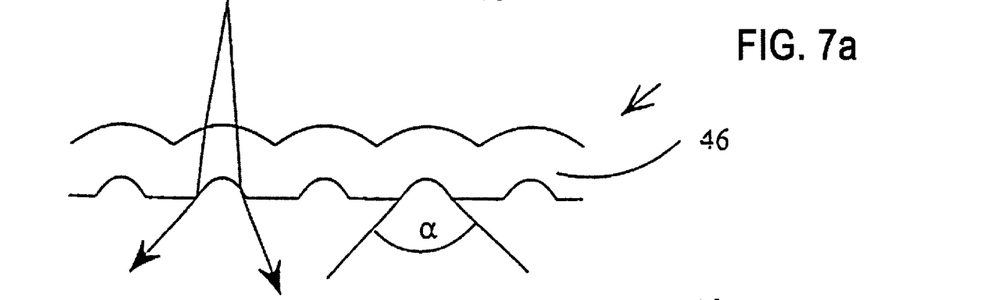
FIGS. 7a–b is a side view of a part of the first light emitting surface comprising a micro-lens system.
Figure 7B:
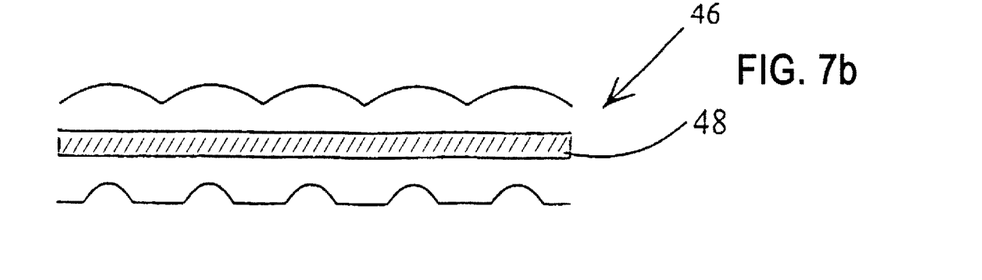

As mentioned above. FIGS. 7a and 7b show a possible embodiment for performing further angle magnification in the plane of the screen. There is provided on the first light emitting surface 40 a micro-lens system 46, which further increases the angle of the incident light beams. The micro-lens system 46 may be manufactured with a known technology, e. g. using optical grade polycarbonate or other plastic with similar properties. It is also possible to make the micro-lens system 46 of two sheets, and including a further dispersion layer 48 between them. The dispersion layer 48 disperses the light beams in the y-direction, if spatial imaging is realised only along the x-direction in the apparatus 10. The dispersion layer 48 may be constructed as a traditional optical cylindrical lens system or holographic element, or in another known manner. The dispersion layer 48 may also provide the necessary horizontal (or vertical) divergence δ of the beams, or this latter may be obtained with further optical elements. The role of the vertical divergence or dispersion will be discussed below.

Figure 8A:
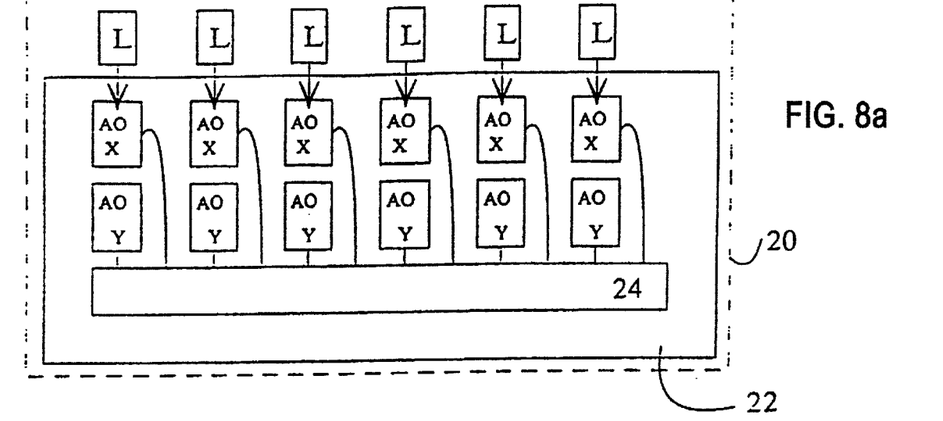
FIGS. 8a–c is a block diagram of three possible versions of the laser- and modulator unit.
Figure 8B:
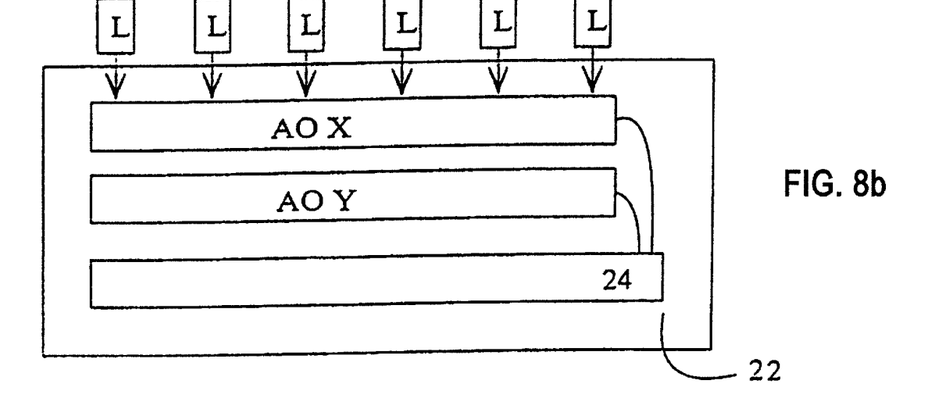
Figure 8C:
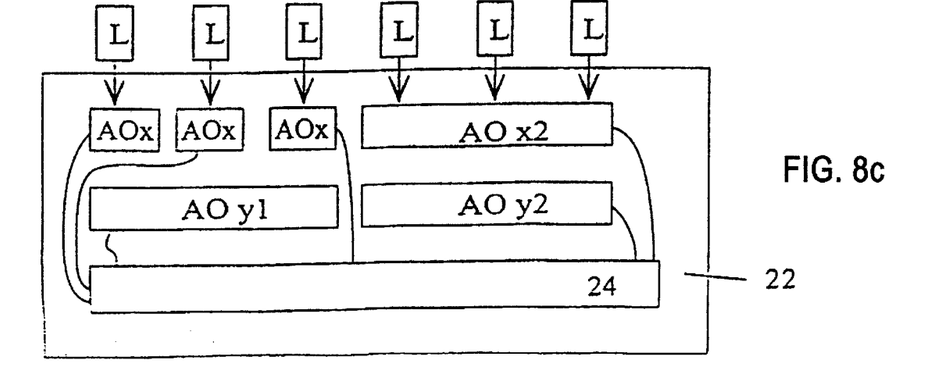

FIGS. 8a–c illustrate the internal structure of the laser- and modulator unit 20. Within the laser- and modulator unit 20 there is a 22 modulator block, comprising the modulator controller 24 and the deflectors AOx and AOy. With the preferred embodiment shown in FIG. 8a there is one separate deflector AOx and AOy for each laser L. Each deflector is connected to a common modulator controller 24. Essentially, it is the modulator controller 24 that controls the individual deflectors according to the signal IN containing the three-dimensional information, and organises the emitted light intensities as a function of the appropriate light emitting directions in such a manner, that the desired image will appear when viewing the P pixels from the different directions. FIG. 8b shows a solution where the lights of all lasers L are deflected and modulated respectively by a larger common deflector AOx and AOy, preferably constructed as a large acousto-optical single crystal. This solution offers the advantage that the construction of the modulator controller is simpler. Its disadvantage is that it makes the device slower, because at least as much time must pass between modulating two lasers, so that there is enough time for the generated ultrasound wave to traverse the whole acousto-optical crystal. Using crystals that are too large may make the system unacceptably slow. As an intermediate solution it is also possible to use the system shown in FIG. 8c, where several, not very long crystals are used as deflectors AOx and AOy, but one deflector modulates the light of several lasers L. As shown, it is also possible to use with more separate x or y direction deflectors AO with one common x or y direction deflector AO. It is understood that the x or y direction deflectors need not be working with the same principle. It is straightforward to combine within the modulator block 22 one or more acousto-optical deflectors with one or more deflectors based on a polygonal mirror, galvanic mirror or other principle.

Figure 9A:
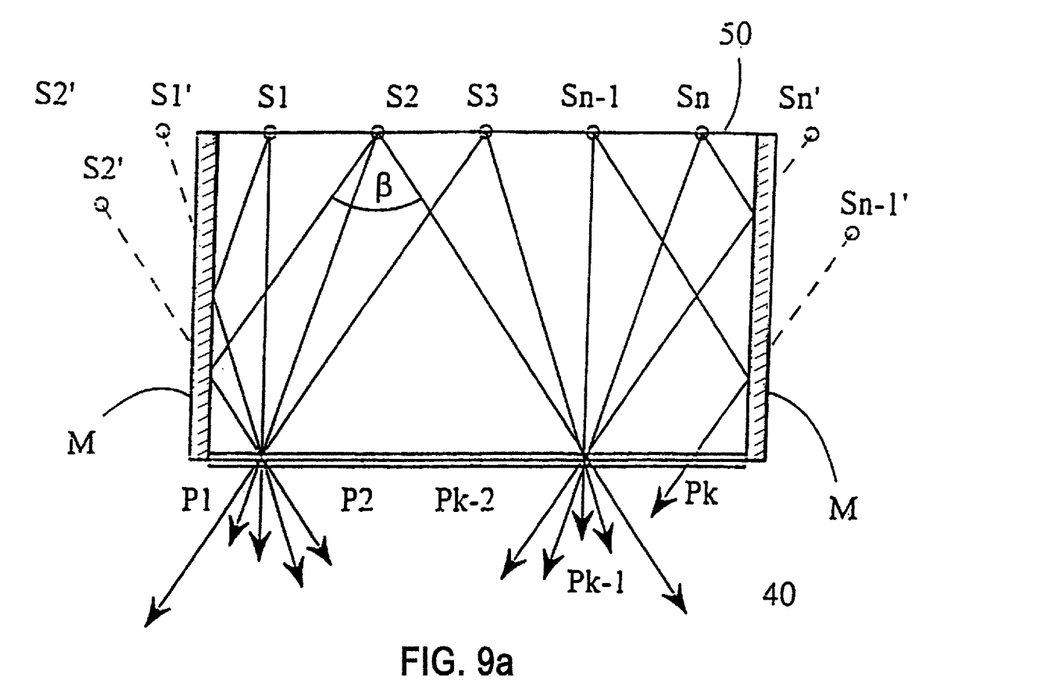
FIGS. 9a–b is a schematic diagram of a system with mirrors on two sides.
Figure 9B:
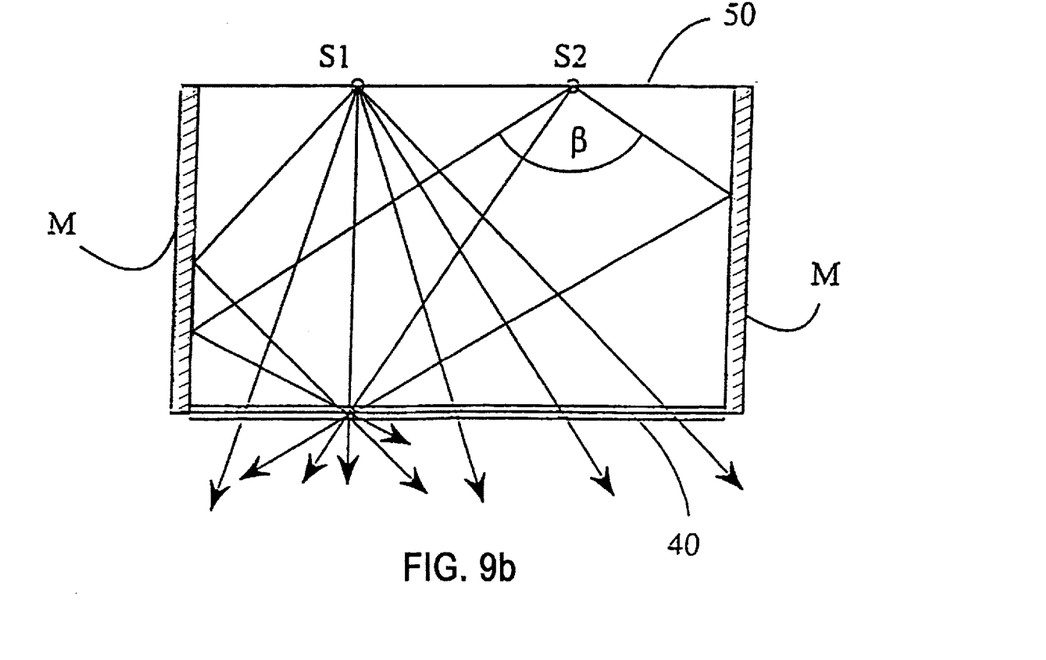
Figure 11A:
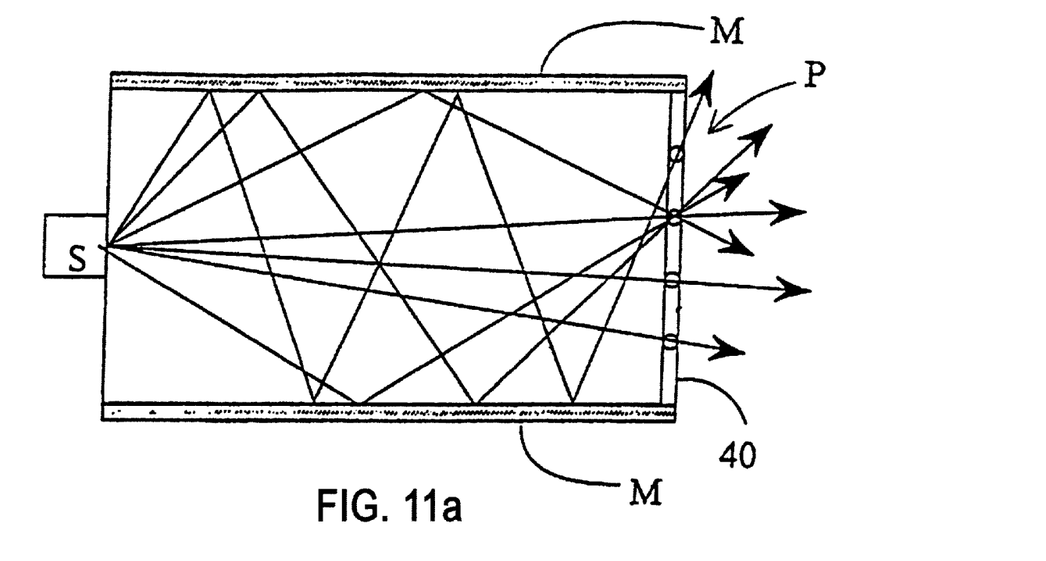
FIG. 11a is a schematic diagram of a system comprising a single light emitting point and side mirrors.

As shown in FIG. 5, it appears that the pixels P placed on the edge of the first light emitting surface 40 can not be reached by the light beams of a sufficient number of light emitting points S. This may be overcome by placing light emitting points S also further to the side, beyond the outer pixels P. But this would mean that the width of the apparatus 10 would increase in an undesirable manner. and the capacity of these outer light emitting points S would not be used to full extent. An improved embodiment of the invention with a suggested solution to overcome this problem is shown in FIGS. 9a–b. Here it is shown that the space between the first light emitting surface 40 and the second light emitting surface 50 is closed on the two sides by the mirrors M. In this manner those light beams of the outer light emitting points S, e. g. of the points S1 and S2, that would otherwise be lost, because they fall in an angle interval that is not used, will be reflected from the mirrors M into the pixels P close to the edge e.g. into the pixel P1. As it appears from FIG. 9a, the reflected beams seem to arrive from the virtual light emitting points S1' and S2' into the pixel P1. In a practical embodiment such beam trajectories are also possible, where the beams emitted from the light emitting points S will be reflected not only from one of the mirrors M. but from both mirrors M, even undergoing multiple reflections if necessary. A few such beams undergoing multiple reflections are shown in FIG. 11a as well.

FIG. 9b illustrates that the number of the light emitting points S may be much smaller than the number of the pixels P. In an extreme case only one light emitting point S is sufficient to illuminate all pixels P. It is conceivable from the above, however, that with the increase of the number of pixels P associated with a single light emitting point S, the number of directions (direction angles) provided by the light emitting point S must increase as well. If the angle resolution is kept constant, the exit angle β of the light emitting point S must increase, or with a constant exit angle β the angle resolution must be increased. Of course, the angle resolution and the exit angle may be increased simultaneously as well.

Figure 10A:
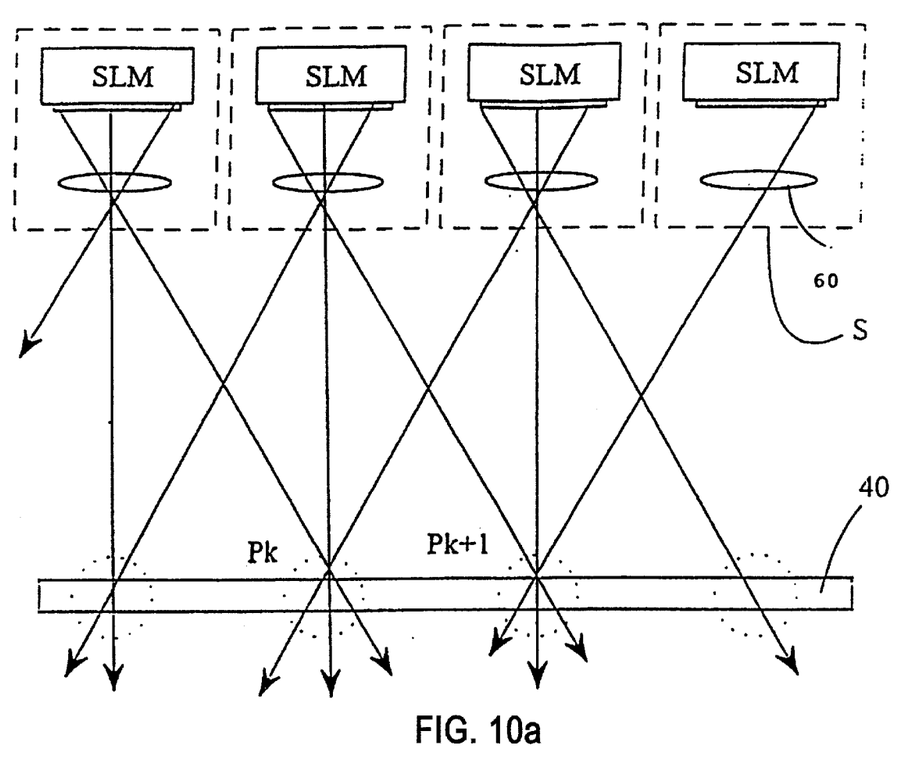
FIG. 10a is a block diagram of a system comprising light emitting points constructed using spatial light modulators (SLM-s)
Figure 10B:
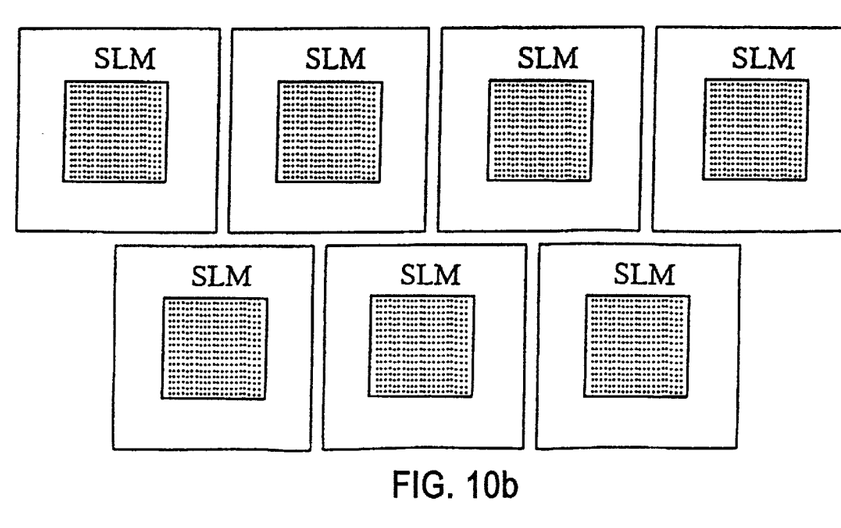
FIG. 10b is a top view of a two-row arrangement with spatial light modulators (SLM-s)

Referring to FIGS. 10a–b, another possible embodiment of the light emitting points in the apparatus 10 is presented. In this embodiment, so-called spatial light modulators (SLM) are utilised as deflectors. These deflectors SLM are illuminated with a suitable light source, preferably a laser (not shown). The light beams reflected in different directions from the extending surface of the deflectors SLM are imaged on the pixels P with a known optical system, in the presented embodiment with the focusing means 60. The focusing means 60 is practically constructed as a projection lens system. Devices applicable as deflectors SLM are off-the shelf items. Considering that the useful controllable surface of these devices is normally smaller, than the physical full width of the device, in a given case it may not be possible to arrange sufficient number of deflectors SLM beside each other in one line. This may be overcome by arranging the deflectors SLM in two (or more) lines, as shown in FIG. 10*b*, and by guiding the light beams exiting from each line into a common plane with a suitable optical system.

Generally, a deflector SLM may be regarded as a small display, providing a two-dimensional image. However the "image" provided by the individual deflectors SLM do not correspond to any real image, but instead it is a sum of image segments, where the image segments represent different images, i. e. image signals of the different points of the object, these different images representing different view angles during the generation of the three-dimensional image signal. The projected two-dimensional images, i. e. the image segments are mixed by the system into a unified three-dimensional image, in such a manner, that when viewing the screen from a given angle, the image segments seen from that view angle will be placed beside each other again.

Figure 11B:
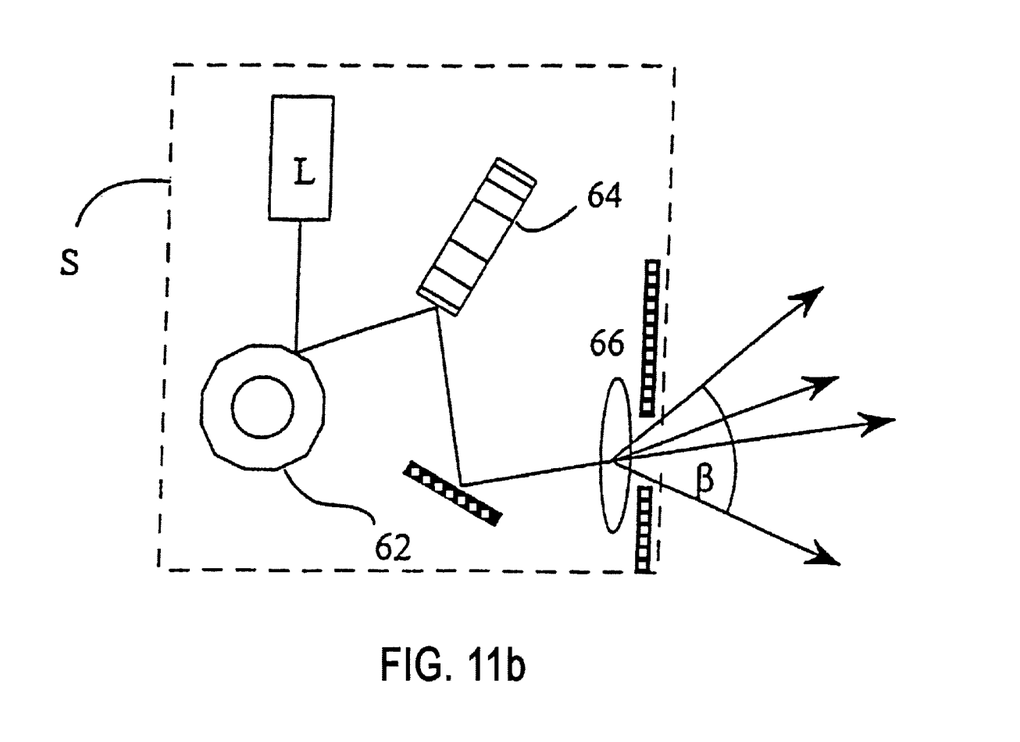
FIG. 11b is a schematic diagram of a practical embodiment of the light emitting point, utilized in the system according to FIG. 11a, FIG. 12 is a schematic cross-section of an optical module used in a preferred embodiment of an apparatus according to the invention.

As mentioned above, the apparatus 10 may be realised using only one single light emitting point S, which will provide light beams from a suitable number of directions for every pixel P, i. e. for n pixels P. FIG. 11*a* shows such a system. In accordance with the above, it is conceivable that if light beams have to be emitted in k different directions with different intensities from a pixel P, than this single light emitting point S must be able to radiate light in k×n directions. Such angle resolution or exit angle can not be obtained with deflector means based on the acousto-optic principle. Therefore, FIG. 1*b* shows the schematic diagram of a light emitting point S, comprising a polygonal mirror 62 performing deflection in the x-direction and a polygonal mirror 64 performing deflection in the y-direction. The beams reflected from the polygonal mirrors are imaged and formed to the desired properties with a known optical system 66.

It is straightforward to reduce the amount of data necessary, or the number of elements used in the system, by combining the arrangement of the invention with known solutions. A possible solution to give up the spatial effect along one co-ordinate. This may be done because the perception of a spatial image is primarily caused by the difference of the images in horizontal directions. This is caused by the fact that the plane defined by our right and left eye is normally horizontal, and therefor we only see the objects differently in horizontal direction. This means that the vertical parallax may be omitted, and thus the amount of transferred information may be substantially reduced. Once more it must be emphasised that with the invention it is possible to create a spatial image both in vertical and horizontal directions.

The amount of information transferred and processed may be further reduced by reducing view angle and the number of directions distinguished within the view angle to a practically treatable and realisable value. It has been found that using a view angle of 30–40° and choosing the angle differences between the viewing directions to 1–2°, spatial (three-dimensional) images with an acceptable quality may be created.

Figure 12:
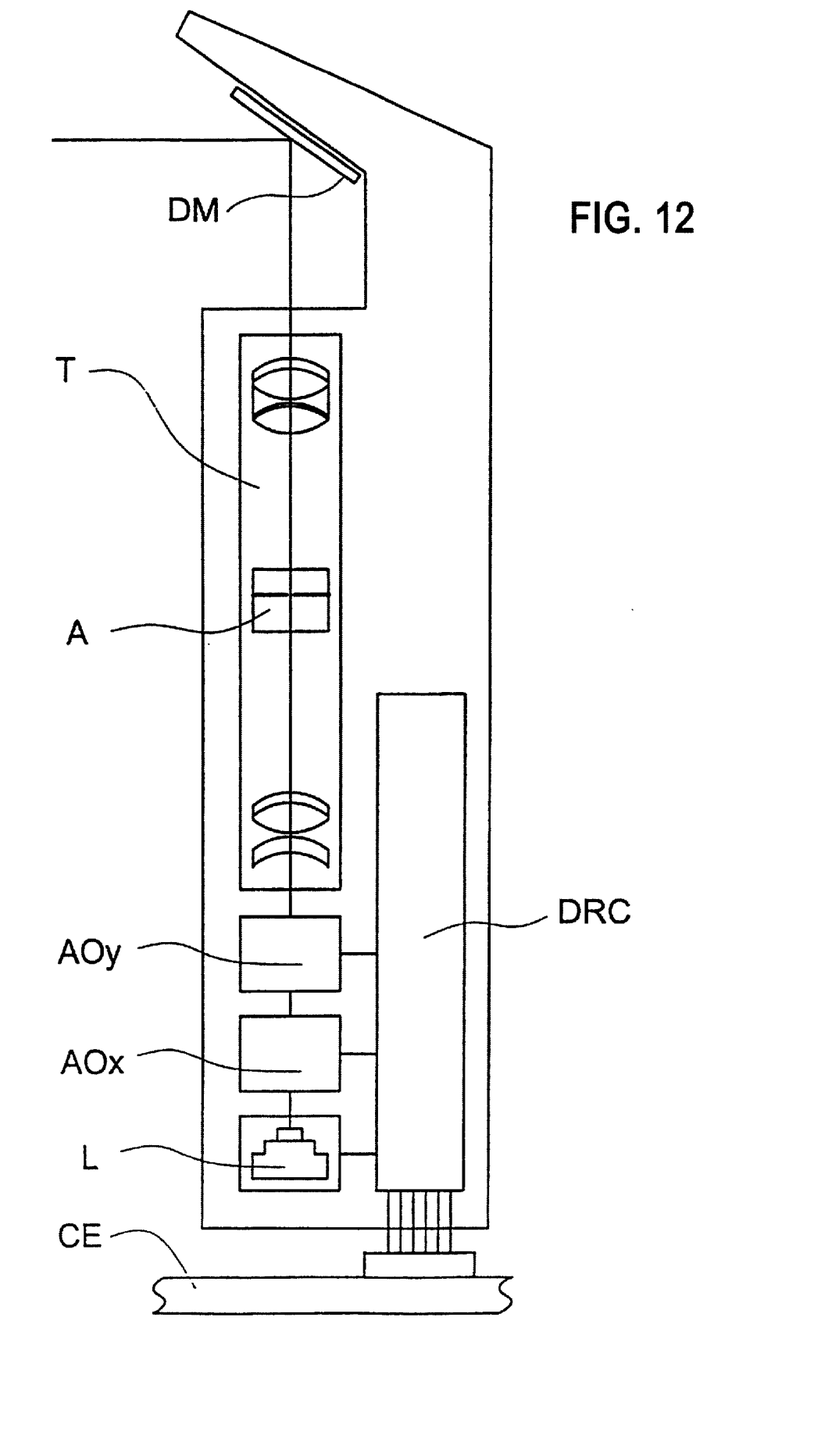

If the 3D-effect along the Y-axis is omitted, it is sufficient to use one row of the light emitting points S. Since the vertical dimension if the light emitting points S is no longer critical, these may be realised as relatively narrow, but tall optical modules, which may be placed close to each other, and therewith creating a row of light emitting points S. A specific, preferred embodiment of such an optical module O is shown of FIG. 12. The optical module O is housed in a flat, long metal block, and the optical and electronic elements are positioned more or less in one plane, to make the optical module O as narrow as possible, and therewith enabling to place a relatively large number of modules beside each other. With the shown preferred embodiment, 60 modules are used, approx. 1 cm apart. The optical modules O all has an identical structure. The optical module O comprises the light source L and the deflectors AOy and AOx, and the angle magnifying optics. The light source L is a diode laser, while the deflectors AOy and AOx are acousto-optical devices. The laser diode and the deflectors AOy and AOx are controlled by the driving circuit DRC. The light beam emitting the deflector AOy goes through the angle magnifier, which contains the telescopic lens system T and one or more apertures A. The angle magnifier also includes cylindrical lenses, to correct the asymmetrical deflecting properties of the acousto-optical modulator devices. The apertures in the telescopic lens system T filter out the non-modulated zero order beam of the acousto-optical deflectors, and improve the resolution of the telescopic lens system T. At the upper end of the module O, the emitted light beam is deflected towards the first light emitting surface, i. e. the screen by the deflecting mirror DM. The optical module O is connected electronically to a mainboard MB carrying the control electronics CE via connectors C, the latter positioned at the bottom of the optical modules O1 . . . Om. The body of the optical modules O1 . . . Om are preferably made of a rigid metal, like high-grade aluminium, in order to provide a solid base for the optical elements, but with good thermal dissipation, because the acousto-optical modulators need efficient cooling.

Omitting the vertical parallax it is advantageous to position such optical elements in the pixels, which in the horizontal direction appropriately deflect the incident light beams or transmits them unchanged, but in vertical direction disperses the light in a vertical plane containing the travelling direction of the light beam. The result is that the emitted light beams become visible, practically independent of the height of the eyes of the person watching the screen, and the visible range of the image will not be confined to a narrow horizontal strip. A dispersion with this characteristics may be produced with holographic optical elements or cylindrical optical elements having a horizontal axis. A known solution to this problem is disclosed in WO94/23541.

Figure 13:
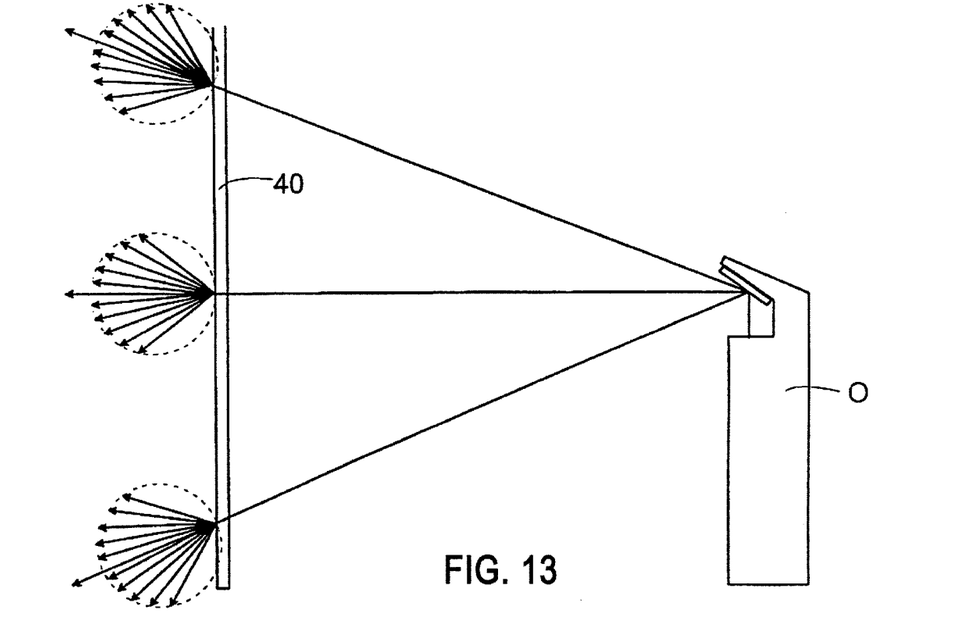
FIG. 13 is a schematic side view showing the vertically deflected light beams of an optical module.

In connection with the vertical dispersion of the light beams emitted from the screen, there is also another problem, which has to be corrected. As shown in FIG. 13, the dispersion of the light beams entering the screen and radiated in the viewing field is not homogenous. Firstly, the central beam is always stronger. than the light beams dispersed to the sides. Secondly, this brighter central beam will be pointing in different directions, depending from the position of the pixel on the screen. Hence, the viewers will be able to perceive and locate the row of the light emitting points (i. e. the exit pupils of the telescopic lenses, reflected in the deflecting mirrors M) as a relatively bright line behind the screen. To correct this disturbing phenomenon, further angle correcting elements are needed on the screen. The function of these angle correcting elements is to make the vertically deflected light beams of the optical modules O enter the dispersing means on the screen (first light emitting surface 40) from parallel directions.

To achieve this effect, several embodiments are foreseen. A few of these are depicted schematically in FIGS. 14*a–c*.

Figure 14A:
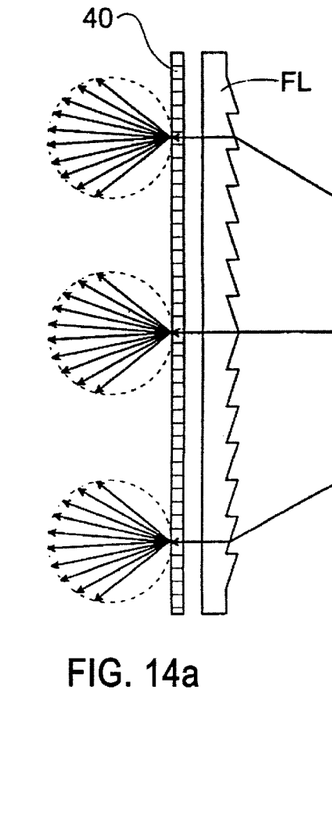
FIGS. 14a–c are schematic side views of different embodiments of the first light emitting surface of the 3D-displaying apparatus of the invention.
Figure 14B:
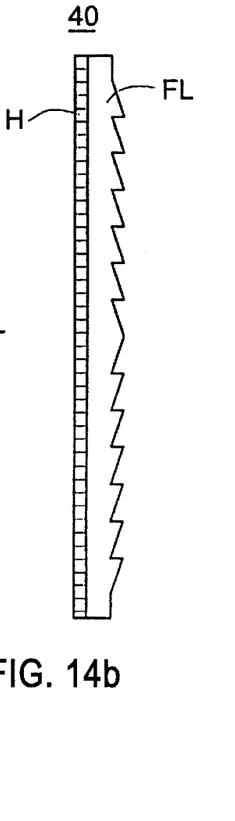

With the embodiment in FIG. 14*a*, the vertical dispersion is achieved by a holographic screen, where the hologram H1 is applied directly on the surface of the first light emitting surface 40. The transformation of the diverging vertical beams into parallel beams is made by a horizontally oriented cylindrical Fresnel lens screen FL. This latter is placed behind the first light emitting surface 40. Another possible embodiment, depicted in FIG. 14*b* includes a combined holographic and Fresnel lens screen. In this case the two sides of the same first light emitting surface 40, i. e. the screen of the apparatus are provided with the holographic surface structure H2 on the outside (looking towards the viewer), and a horizontally oriented cylindrical Fresnel lens surface FLS on the inside (looking towards the optical modules). The structured surfaces may be manufactured using known methods, like embossing, moulding or etching.

Figure 14C:
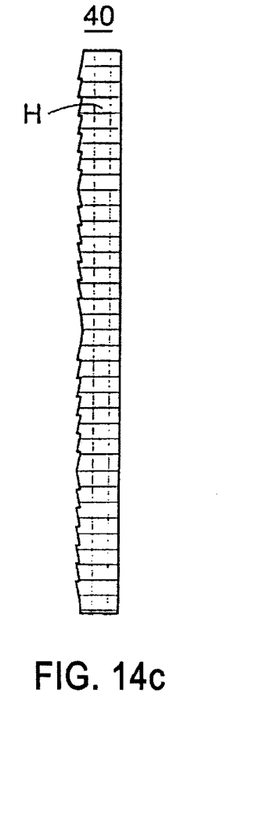

A third embodiment, comprising a combined holographic screen H3 is shown in FIG. 14*c*. In this latter case, the combined holographic screen H3 performs both the vertical dispersion of the light beams and the necessary divergent-to-parallel beam correction.

Figure 15:
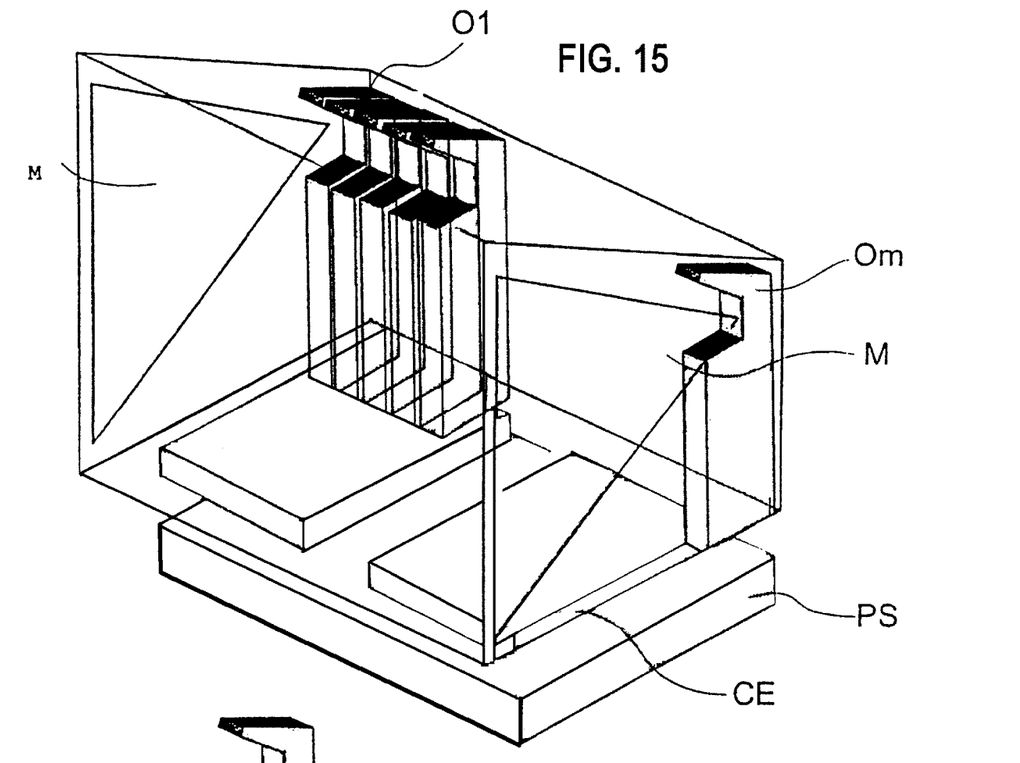
FIG. 15 is a spatial view of the spatial configuration of the main elements of the 3D-displaying apparatus of the invention.
Figure 16:
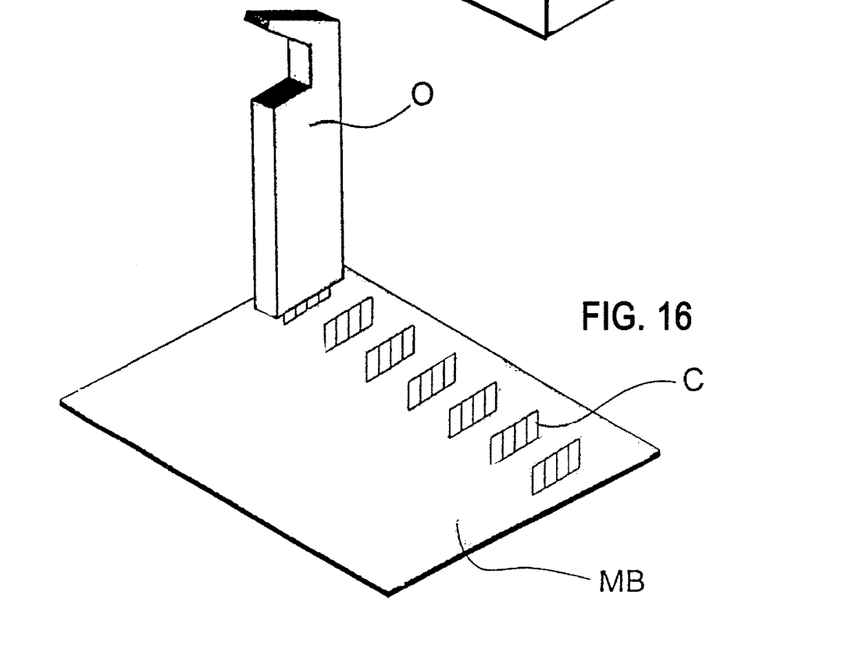
FIG. 16 illustrates the connecting of the optical modules of the apparatus of FIG. 15.

FIG. 15 illustrates the spatial arrangement of the elements of the optical system in a preferred embodiment of the 3D-display apparatus according to the invention. The optical modules O1–Om serving as the light emitting points are arranged in a row at the backside of the apparatus, stacked parallel and closely to each other, with the exit aperture of the telescopic lens system T looking upwards, so that the deflecting mirrors DM will project the light beams towards the screen positioned on the front side of the apparatus. Two triangularly shaped mirrors M close the two sides of the projection space. The control electronics CE, and the power supply PS are located under the optical system. The power supply PS powers the control electronics CE, the light sources L and the acousto-optical modulators AOx and AOy in the optical modules O1–Om. The optical modules O1–Om are placed on a common mainboard MB of the control electronics (not shown in FIG. 15), and connected thereto electronically with the connectors C. The physical configuration of the optical modules O with the mainboard MB of the control circuit and the connectors C is shown in FIG. 16.

The colour version of the display apparatus may be provided using known solutions. A possible method is to make the light emitting points S with the three basic colours—red, blue, green—and mixing the differently coloured light beams using known optical methods, either before or after the deflectors AO or after the angle magnifiers D.

What is claimed is:

1. A method for producing a three-dimensional image, comprising the steps of:
    simultaneously modulating a—preferably spatially coherent—light beam by a video signal containing three-dimensional image information; and
    directing the modulated light beam to pixels (image points) defining a first light emitting surface;
    emitting a component of the light beam from the pixels within a predetermined angle of view (field of view) in the different view directions, with an intensity corresponding to the three-dimensional image,
    directing the modulated light beams to the pixels from different entry angles, depending on the emitting angles within the angle of view, characterised by
    directing the light beams modulated corresponding to the different directions to the pixels of the first light emitting surface from one or more light emitting points of a second light emitting surface, said second light emitting surface being spaced apart with a predetermined distance from the first light emitting surface.

2. A method according to claim 1, characterised by
    selecting the number of the light emitting points and the number of light beams (the angle resolution) emitted therefrom such, that their product is equal to the product of the number of pixels and the number of directions (the angle resolution) into which light beams are emitted from the pixels.

3. A method according to claim 2, characterised by
    simultaneously modulating the light beams emitted in the same direction from the pixels and associated with different pixels with light information associated with the same direction, and
    modulating the light beams of the light emitting points corresponding to the different emitting directions of the same pixel with the light information corresponding to the different view directions of the same pixel.

4. A method according to claim 2, characterised by
    electing the light emitting angle of the light emitting points of the second light emitting surface equal to the view angle (field of view) of the pixels of the first light emitting surface.

5. A method according to claim 2, characterised by
    selecting the light emitting angle of the light emitting points of the second light emitting surface smaller or larger than the view angle (field of view) of the pixels of the first light emitting surface.

6. A method according to claim 5, characterised by
    applying angle correction on the light emitting angle of the light emitting points between the light emitting points and the pixels, or applying angle correction on the view angle (field of view) of the pixels in the pixels.

7. A method according to claim 1, characterised by
    deflecting the light beams of the light emitting points emitted in directions bypassing the pixels of the first light emitting surface into corresponding pixels with a mirror.

8. An apparatus for producing three-dimensional images, comprising a light source (L) modulated with video signal containing three-dimensional information. and a deflecting system controlled in time and directed towards the pixels (P1 . . . Pn) of a light emitting surface (40), wherein the light emitting surface is comprising one or more optical means transmitting and/or deflecting light beams in different directions (i1 . . . in) within a predetermined field of view (view angle α), and the deflecting system comprising deflecting means corresponding to the view directions defining the field of view (view angle α) and corresponding to the pixels, characterised by that
    it comprises a second light emitting surface (50) comprising light emitting points (S1 . . . Sm), the second light emitting surface being spaced apart from the light emitting surface (40) containing the pixels (P1 . . . Pn) in a predetermined distance, and
    for each direction (i1 . . . in) of the pixels (P1 . . . Pn) of the first light emitting surface (40) there is an associated light emitting point (S1 . . . Sm) of the second light emitting surface (50), and for each light emitting point (S1 . . . Sm) there are several associated pixels (P1 . . . Pn).

9. The apparatus according to claim 8, characterised by that
the number of the directions (the angle resolution) of the light beams emitted from the light emitting points (S1 . . . Sm) is t times the number of directions of the light beams emitted from the pixels (P1 . . . Pn), the value of t being preferably between one and the number of pixels (P1 . . . Pn) arranged in one line, while the number of the light emitting points (S1 . . . Sm) is one t-th of the number of the pixels (P1 . . . Pn) and the distances between the light emitting points (S1 . . . Sm) are t times the distances between the pixels (P1 . . . Pn).

10. The apparatus according to claim 8, characterised by that
the light emitting points (S1 . . . Sm) comprise acousto-optical means, polygonal mirrors, galvanic mirrors, hologram discs, electro-optical means or variable index LCD means, producing time-resolved controlled deflection in accordance with the directions defining the view angle ($\alpha$) or field of view, and if necessary comprising one or more angle correction elements (D) between the time-resolved controlled deflection means and the first light emitting surface (40), and/or on the light emitting surface (40).

11. The apparatus according to claim 10, characterised by that
the time-resolved controlled deflection means comprise subsequently arranged X-direction and Y-direction deflection means, where one X-direction deflection means (AOx) is arranged to all light beams or to a group of the light beams or to each one of the light beams, and one Y-direction deflection means (AOy) is arranged to all light beams or to a group of the light beams or to each one of the light beams.

12. The apparatus according to claim 11, characterised by that the time-resolved controlled deflection means and the light sources (L) are arranged in optical modules (O1 . . . Om) having substantially identical structure, said modules being aligned in one row and connected to a mainboard (MB) and/or to control electronics (CE).

13. The apparatus according to claim 12, characterised by that each of the optical modules (O1 . . . Om) comprise a light source (L) for producing a light beam defining an optical axis, the light source being connected to a light source driver; an X-direction deflector (Aox) and a Y-direction deflector (AOy) both of them connected to a driver and arranged on the optical axis of the light source; deflector correction elements comprising cylindrical optical elements, angle correction elements preferably telescopic lenses (T) and aperture elements (A); a deflection mirror (DM) for deflecting the light beam towards the first light emitting surface (40).

14. The apparatus according to claim 8, characterised by that
in the deflection system the time-resolved controlled deflection means associated with the view directions defining the view angle (field of view) are comprising spatial light modulator (SLM) means, and comprising focusing elements between the SLM means and the first light emitting surface.

15. The apparatus according to claim 8, characterised by comprising side mirrors (M), said mirrors deflecting those light beams emitted from the light emitting points (S) into corresponding pixels (P), which light beams would otherwise bypass the pixels of the first light emitting surface (40).

16. The apparatus according to claim 15, characterised by that the side mirrors (M) for deflecting the light beams are substantially triangle shaped.

17. The apparatus according to claim 8, characterised by that the first light emitting surface comprises one or more diffractive or refractive optical elements, producing a diffusion of the light beams in horizontal direction at least half of the angle between the directions of neighbouring light beams emitted from the pixels, and not greater than twice this angle, while the diffusion in vertical direction being larger than the horizontal diffusion and not greater than 180°.

18. The apparatus according to claim 17, characterised by that the first light emitting surface (40) comprises divergence correction means for vertical correction of the light beam emitted by the light source (L) and reaching the first light emitting surface (40) at different angles, said divergence correction means producing substantially parallel light beams passing through the light emitting surface (40).

19. The apparatus according to claim 18, characterised by that the divergence correction means comprises
a) a cylindrical Fresnel lens (FL) placed behind the first light emitting surface (40) or
b) a first light emitting surface (40) with a vertically dispersive holographic structure (H2) on one side and a cylindrical Fresnel lens (FL) formed on the other side, or
c) a light emitting surface (40) having a combined dispersive and divergence correcting holographic (H3) structure.

* * * * *